Sept. 8, 1959 J. M. MARTIN ET AL 2,903,502

CONTROLLED SPACING SIGNAL WIRE DISTRIBUTION SYSTEM

Filed Nov. 21, 1955

INVENTORS.
JOSEPH M. MARTIN
RICHARD T. NORWOOD
PAUL WINSOR III

BY Ralzemond B. Parker

ATTORNEY 2,903,502

CONTROLLED SPACING SIGNAL WIRE DISTRIBUTION SYSTEM

Joseph M. Martin, Van Nuys, Calif., Richard T. Norwood, Fort Wayne, Ind., and Paul Winsor III, Wayne, Pa., assignors to Burroughs Corporation, Detroit, Mich., a corporation of Michigan Application November 21, 1955, Serial No. 548,293

3 Claims. (Cl. 174—72)

The present invention relates to the distribution of electrical circuits and more particularly to the supporting and interconnection of conductors in complex circuit banks, such as complicated computers and the like.

Circuit distribution to which the invention relates has herebefore proposed the use of the printed circuit type and also by employing the telegraph pole type. The former has proven too expensive and is also open to the objection that it does not have the required flexibility for this type of conductor bank assembly. The latter, while not presenting a neat orderly appearance, does not give adequate spacing of conductors for optimum capacitance control and is not at all feasible as a solution to the problem here solved by applicants.

An object of the invention is to provide an improved distribution system for conductors in circuits forming complex bank wiring.

Another object is to provide for the transmission and distribution of high frequency impulses in a manner to reduce capacitance to a negligible effect.

Another object is to provide a system of circuit distribution which is flexible and greatly facilitates the wiring of complex circuits such as required in large scale computers or the like.

Another object is to provide a distribution system wherein novel preformed conduction means are associated with supporting and retaining means to function together for interconnecting circuit selection.

In the accompanying drawings.

Figures 1, 2, 3, 4, 5, 6, 7:
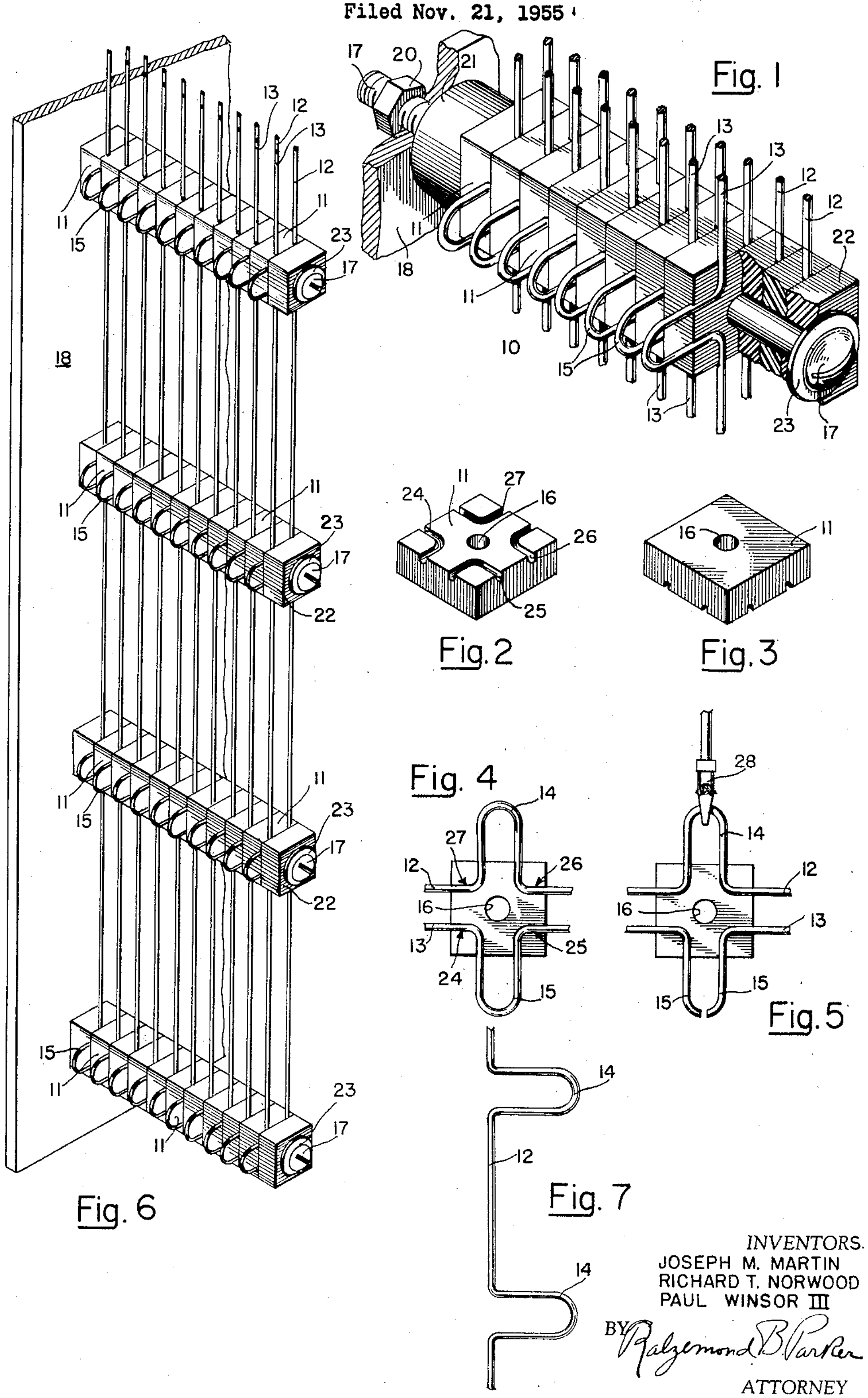
Figure 1 is a perspective view partly broken away of a wire supporting post embodying one form of the present invention and showing conducting wires as assembled.
Figure 2 is a perspective view of any one of the several blocks used in assembling a post.
Figure 3 is a perspective of the block of Figure 2 showing the other supporting face.
Figure 4 is a plan of a block with two wires in place and showing the projecting lugs for circuit connection.
Figure 5 is a view like Figure 4 showing one lug severed to interrupt a circuit and a clip connection on the other lug.
Figure 6 is a perspective view of a bank of wires as assembled with the spaced posts of the invention.
Figure 7 is an example of the preformed wires for association with the posts.

Referring to the drawings, one form of the present invention comprises a post 10, formed of a plurality of insulating blocks 11, arranged in face to face relation as a stack, each of which provides a support for two conducting wires 12 and 13, these wires, in the use to which the invention more specifically applies, being bare wires for transmitting high frequency impulses in, for example, the complex wiring of a large scale computer. It will be observed that the post 10 is capable of expansion or contraction by adding or removing individual blocks 11 to meet bank or other wiring conditions.

As a part of the present invention the wires 12 and 13 are respectively preformed with loops 14 and 15 so spaced as to coincide with the spacing between posts 10, such loops 14 and 15 serving as soldering or jack lugs for connecting respectively with associated circuits in a common plane, or at an angle to that plane, or for jumpers from one lug to a selected wire of the bank of wires supported by rows of the posts 10. Figure 7 illustrates the preformed wiring for both wires 12 and 13, since a wire can be reversed to change the loops from one side of the post to the other.

Each block 11, in the preferred form, is of square shape having a thickness such as will most effectively space adjacent conductors to minimize capacitance, while a central through hole 16 is provided for stacking upon a post mounting bolt 17. This bolt 17 passes through the aligned holes 16 of abutting blocks and has a length to project its threaded end sufficiently to pass through a mounting panel 18 and be bolted thereto by nuts 20. The bolt 17 also carries a spacer base 21 of insulating material and a cap 22, so that the block stack can be rigidly clamped between the spacer base and the cap. A washer 23 is interposed between the head of the bolt 17 and the cap 22 for positive clamping action.

For supporting and retaining the pair of conducting wires 12 and 13 in a block 11, wire receiving grooves are molded into one face of the block, preferably the upper face for wire support, and as shown in Figure 2 each face has four arcuate grooves 24, 25, 26 and 27 respectively developed about the corners of the block as a center upon the same radius. The grooves 24 and 25 function as a pair to seat the opposed bends of the loop 15, and the grooves 26 and 27 function as a pair to seat the opposed bends of the loop 14. Thus the loops 14 and 15 project respectively from opposite sides of the block, while the seated bends are retained below the plane of the face of the block to thereby permit symmetrical arrangement of the blocks with the pair of wires of the next block. While the foregoing describes each block as supporting and retaining a pair of conducting wires, the system of the invention also comprehends a single wire traversing the block in which case but one attaching lug of the wire projects.

It will now be apparent that a novel system of mounting circuit wires, particularly for bank assembly, has been devised whereby compact wiring is possible with the likelihood of capacitance interfering with the circuit operation being reduced to a negligible condition. Furthermore, the system of the invention is flexible being capable of expansion or contraction at will by varying the number of blocks on a post. Also it provides means for interconnecting circuits by jumpers for quick circuit selection as indicated by the clip 28 in Figure 5, or by severing a projecting lug any circuit can be terminated as desired as likewise indicated in Figure 5.

What is claimed is:

1. A wire spacing and distributing assembly including a plurality of stand-off laminated insulating posts, each post comprising a plurality of dielectric blocks, each block having two pairs of arcuate grooves in a planar face thereof and being provided with a through hole, a plurality of preformed electrically conductive wires having recurring loops formed along their length, portions of each loop being disposed in the grooves of each of said blocks so that a part of each loop extends from the block for connection into associated circuitry, and a member perpendicular to the wires projecting through said holes registering said blocks in a post for attachment to a panel.

2. A laminated wire distribution assembly comprising, a plurality of posts, each of said posts being constructed of similarly formed dielectric blocks, each block being provided with a through hole and oppositely facing planar surfaces, two pairs of grooves disposed in one planar surface of each block the center of curvature of said grooves being a block corner, the oppositely facing planar surface of another and adjacent block forming a closure for said grooves, a plurality of electrically conductive wires each preformed with a series of loops, portions of each loop being disposed in the grooves of a block of each of said posts, the depth of each groove being substantially equal to the diameter of the wire received therein thereby holding each wire tightly within the groove, and a member extending through each of the blocks of each post perpendicular to the wires for securing said blocks together and said post to a panel 3. A laminated wire distribution assembly as shown in claim 2 wherein the posts are equally spaced and in the same plane.

References Cited in the file of this patent

UNITED STATES PATENTS

| | | |
|---|---|---|
| 266,677 | Corbett | Oct. 31, 1882 |
| 399,343 | Penney et al. | Mar. 12, 1889 |
| 1,227,904 | Goodrum et al. | May 29, 1917 |
| 1,541,756 | Williams | June 9, 1925 |

FOREIGN PATENTS

| | | |
|---|---|---|
| 205,209 | Great Britain | Oct. 15, 1923 |